United States Patent [19]

Chien

[11] Patent Number: 5,846,385
[45] Date of Patent: Dec. 8, 1998

[54] PROCESS AND APPARATUS FOR ENERGY RECOVERING THROUGH WASTE CLASSIFICATION AND CALCINATION

[76] Inventor: Szu Jeng Chien, 5F., No. 1, Alley 19, Lane 284, Wu-Hsing St., Taipei, Taiwan

[21] Appl. No.: 859,424

[22] Filed: May 20, 1997

[51] Int. Cl.$^6$ .............................. C10G 1/00; C10B 55/00; B09B 3/00
[52] U.S. Cl. .............................. 196/98; 196/116; 196/120; 585/240; 585/241; 201/2.5; 201/3; 201/15; 201/23; 422/184.1; 208/427; 208/430
[58] Field of Search .............................. 196/98, 116, 120; 585/240, 241; 201/2.5, 3, 15, 23, 25; 208/427, 430; 422/184.1

[56] References Cited

U.S. PATENT DOCUMENTS

| | | | |
|---|---|---|---|
| 4,175,211 | 11/1979 | Chen et al. .............................. | 585/241 |
| 5,057,189 | 10/1991 | Apffel .............................. | 202/113 |
| 5,608,136 | 3/1997 | Maezawa et al. .............................. | 588/228 |
| 5,756,871 | 5/1998 | Wang .............................. | 585/241 |

*Primary Examiner*—Bekir L. Yildirim
*Attorney, Agent, or Firm*—Beveridge, DeGrandi, Weilacher & Young, LLP

[57] ABSTRACT

The invention provide a process for energy recovering through waste classification and calcination and an apparatus therefor, comprises crushing and sorting various types of wastes and by means of a series of classification, calcination and recovering treatments, recovering and reusing efficiently fuel oil, fuel gas and residues as well as electric power and heat required for the apparatus in the self-supplying feedback system of the invention, and additionally, lowering successfully the possibility of secondary pollution from wastes disposal.

4 Claims, 5 Drawing Sheets

PROCESS AND APPARATUS FOR ENERGY RECOVERING THROUGH WASTE CLASSIFICATION AND CALCINATION

BACKGROUND OF THE INVENTION

1. Field of the Invention

The invention relates to a process for energy recovering through waste classification and calcination and to apparatus therefor, and in particular, to a process and apparatus therefor for recovering high added-value converted products such as fuel oil, carbon ash, gases and refractory materials through classifying wastes into combustible wastes and plastics wastes and calcinating the same.

2. Description of the Prior Art

Recently, due to diversification of ordinary life, wastes produced by families and factories constantly increase while their types become more complicated. As it is known that treatments of different types of wastes are different, however, since sorting of wastes is difficult, problem of waste disposal is increasingly sever and becomes one of the subjects that must resolve immediately.

Conventional waste treatments comprises calcination or landfill without primiliarly sorting and treating separately according to types of wastes. Such waste disposal may not only pollute the environment, but also, without saying, can not achieve the goal of energy recovering. Among the wastes, plastic wastes have become public pollutants owing to their natural undegradability and gradual accumulation. Conventional disposal of plastic wastes comprises calcinating or otherwise, sorting for recovering. Wherein, calcination process consists of burning plastic waste directly, while sorting/recovering process comprises sorting of plastic wastes and recovering of reclaimed plastics. The former is purely a consumption engineering which needs expensive accompanied equipments for preventing secondary public nuisance such as air pollution, while sorting/recovering process has problem of handling difficulty due to huge and complex types of plastics and additives contained therein as well as of poor quality of reclaimed products which can not retain a practicable level.

SUMMARY OF THE INVENTION

In view of conventional waste disposal process being resided in just for temporary convenience without considering future global ecological environment, the inventors have planned and studied extensively, and as a result, have designed a process for waste treatment and an apparatus therefor, wherein, after being treated by the apparatus according to the invention, wastes do not occupy space as is in landfill process nor pollute environment as in calcination process. And, furthermore, by means of waste classification and calcination, the apparatus according to the invention can convert useless wastes into high added-value products such as fuel oil, carbon ash, gas and refractory materials so as to achieve the goal of energy recovery.

Accordingly, the object of the invention is to provide a process for recovering energy through waste classification and calcination and to an apparatus therefor, comprises of applying a series of treatments as classification, calcination, and recovering on wastes to be treated so as to recover efficiently fuel oil, fuel gases and reclaimed residues, and supply power and heat needed by the self-satisfying feedback system, as well as lower successfully the possibility of secondary pollution from waste treatment.

BRIEF DESCRIPTION OF THE DRAWINGS

The invention, as well as its many advantages, may be further understood by the following detailed description and drawings in which.

Figure 1:
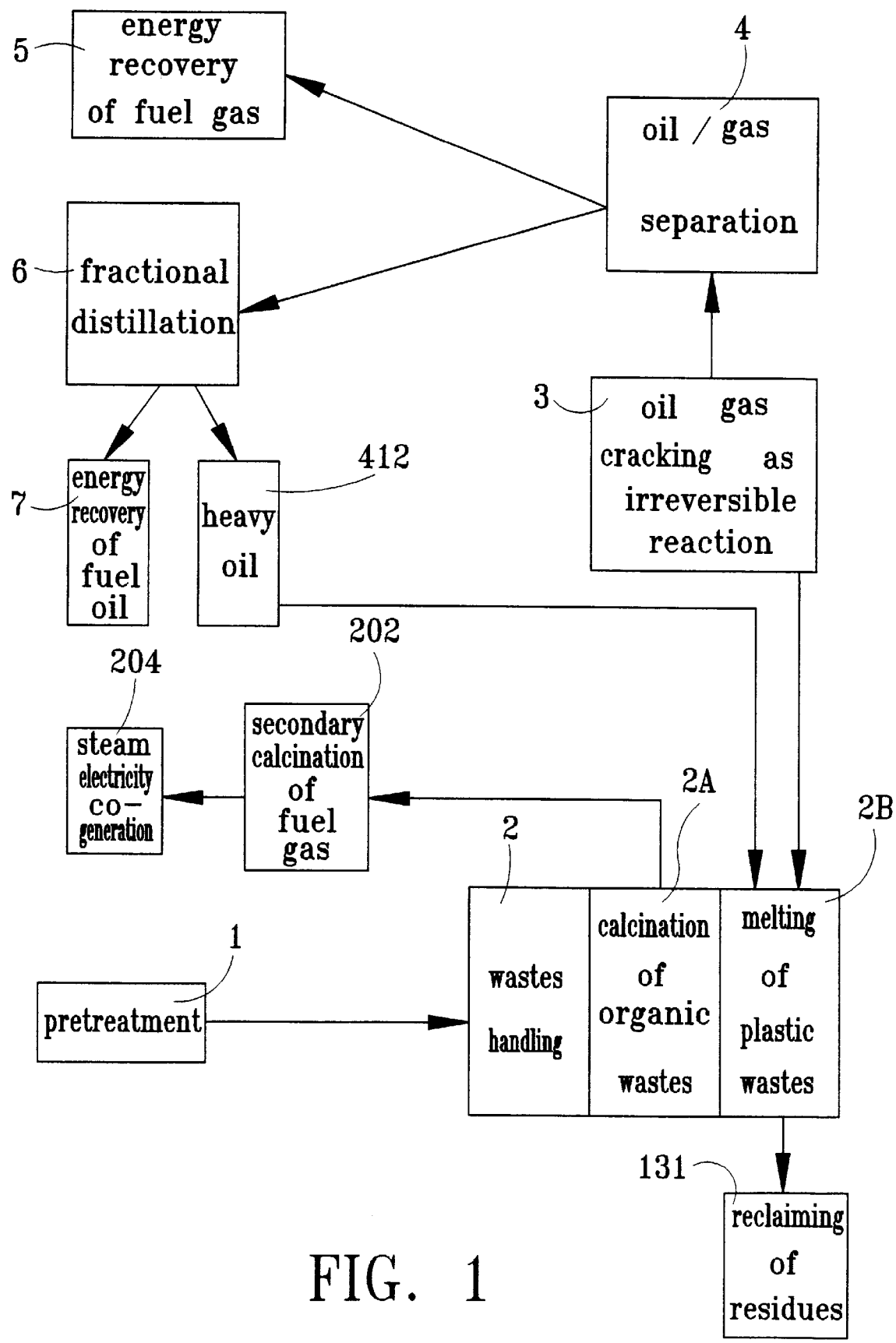
FIG. 1 is the flow sheet of the process for energy recovering through waste classification and calcination according to the invention.

EXPLANATION OF NOTATIONS:

(1) pretreatment
(10) wastes
(11) mixed wastes
(12) organic wastes
(121) ash
(13) light weight wastes
(131) residues
(2) waste treatment
(2A) calcination of organic wastes
(2B) heat melting
(20) calcination furnace
(201) furnace body
(202) secondary calcination furnace
(203) heat exchanger
(204) steam electricity co-generation system
(21) cracking furnace
(211) cooling water lines
(212) valve
(213) lid
(214) inlet
(22) calcination plate
(221) hole
(23) conveying lines
(24) heavy oil lines
(241) valve
(25) oil gas
(251) oil gas lines
(26) airlines
(261) air
(27) gas lines
(28) mobile plate
(29) hot flue gas
(291) hot flue gas lines
(3) irreversible cracking of oil gases
(31) reactor
(311) spacer
(312) screen plate
(32) first condenser
(33) second condenser
(34) precipitation tank
(35) waste water treator
(4) oil/gas separation
(40) oil/gas separation tank
(41) crude oil
(411) distillate
(412) heavy oil
(413) distillate
(414) distillate
(42) fuel gas
(43) gas storing tank

(44) gas cylinder
(45) heavy oil storing tank
(5) fuel gas energy recovery
(6) fractional distillation
(60) fractionating column
(61) cooler
(62) distiller
(63) storage in first oil storing tank
(64) storage in second oil storing tank
(65,66) washing tank
(67) diesel oil storing tank
(671) diesel oil
(68) gasoline storing tank
(681) advanced gasoline
(682) leadless gasoline
(7) diesel oil energy recovery
(9) garbage wagon
(90) conveying belt
(91) crusher
(911) pulverator
(92) conveying belt
(X,Y,Z) outlet

DETAIL DESCRIPTION OF THE PREFERRED EMBODIMENT

Refer to FIG. 1, the invention provides a process for energy recovering through waste classification and calcination, comprises steps of:
(1) pretreatment
  Crushing various waste (10) into crushed state and sorting the crushed wastes based on specific gravity into mixed waste (11), organic waste (12) and light weight plastic waste (13), etc. Among which, mixed waste (11) can be subdivided to separate metal for selling, while the remainder can be landfilled or made into artificial reef,
(2) waste treatment
  the plastics-containing light weight waste (13) obtained from the pretreatment step (1) described above can be mixed with solvent and conduct heat dissolving treatment (2B), while organic waste (12) obtained from the pretreatment step (1) can be calcinated with gas (2A) where the high temperature heat energy generated can be used in heat dissolving (2B) of the light weight waste (13) and in cracking of plastics into oil gas (25);
(3) irreversible cracking of oil gas
  introducing oil gas (25) into a reactor (31) and carrying out irreversible reaction to cleave molecules under controlled temperature and pressure;
(4) oil/gas separation
  collecting oil gas (25) obtained in above step (3) and cooling stepwise to near atmospheric temperature to condense and precipitate into liquid state which is recovered as crude oil (41), while part of gases uncondensed is recovered as fuel gas (42);
(5) fuel gas energy recovery
  pressure liquifying fuel gas (42) obtained in step (4) described above and storing or dispensing into cylinder for selling or providing heat for apparatus therein;
(6) fractional distillation
  crude oil (41) obtained from above step (4) can be heated, cooled, fractional distilled and collected distillate (413, 414);
(7) energy recovery from fuel oil
  distillates obtained from fractional distillation (6) described above can be subject to pickling, neutralizing and removing contaminants, then, precipitating to bleach and recovered as pure diesel oil or gasoline.

Figure 2:
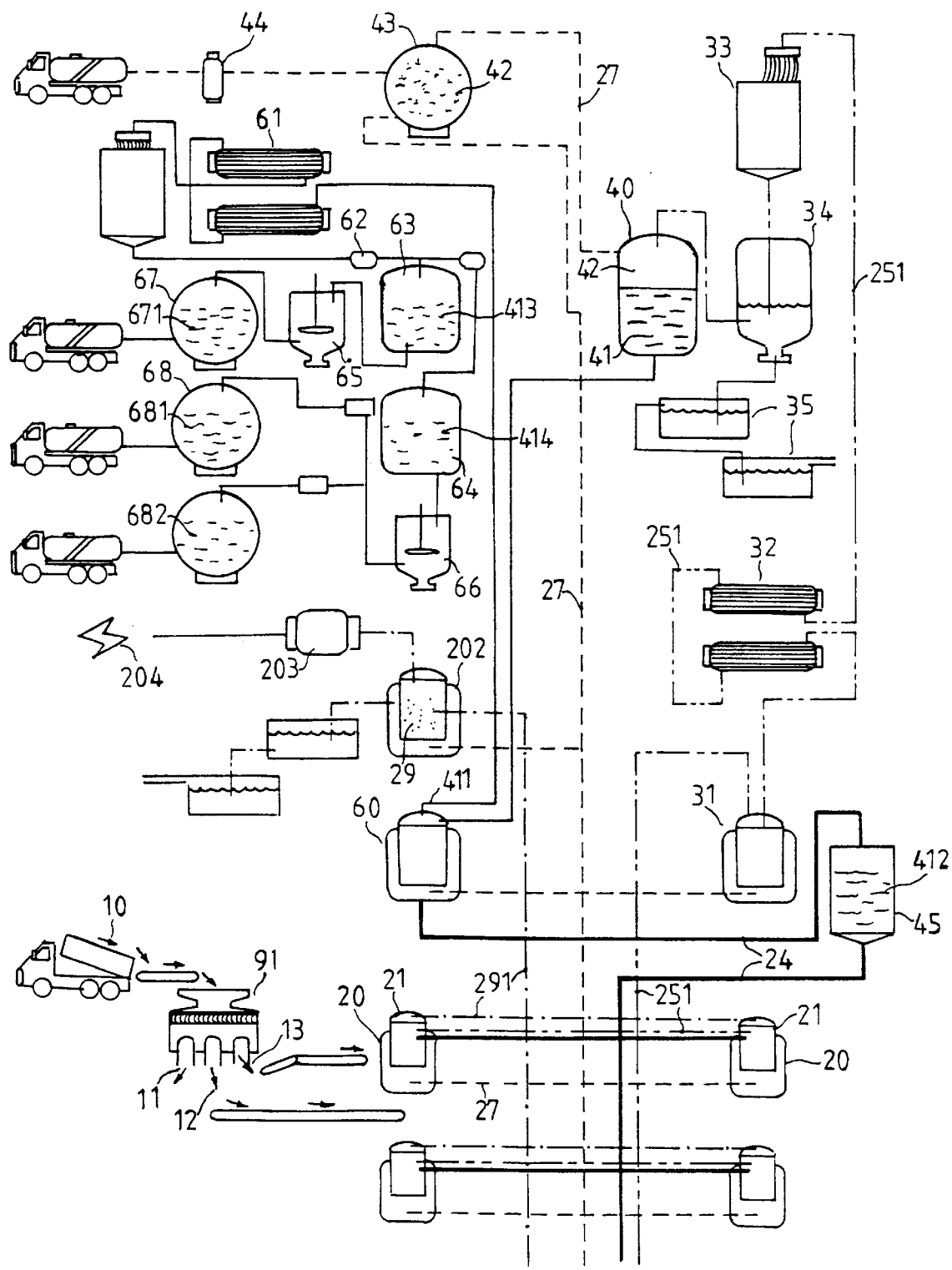
FIG. 2 is the flow sheet of related apparatus used in the process for energy recovering through waste classification and calcination according to the invention.
Figure 3:
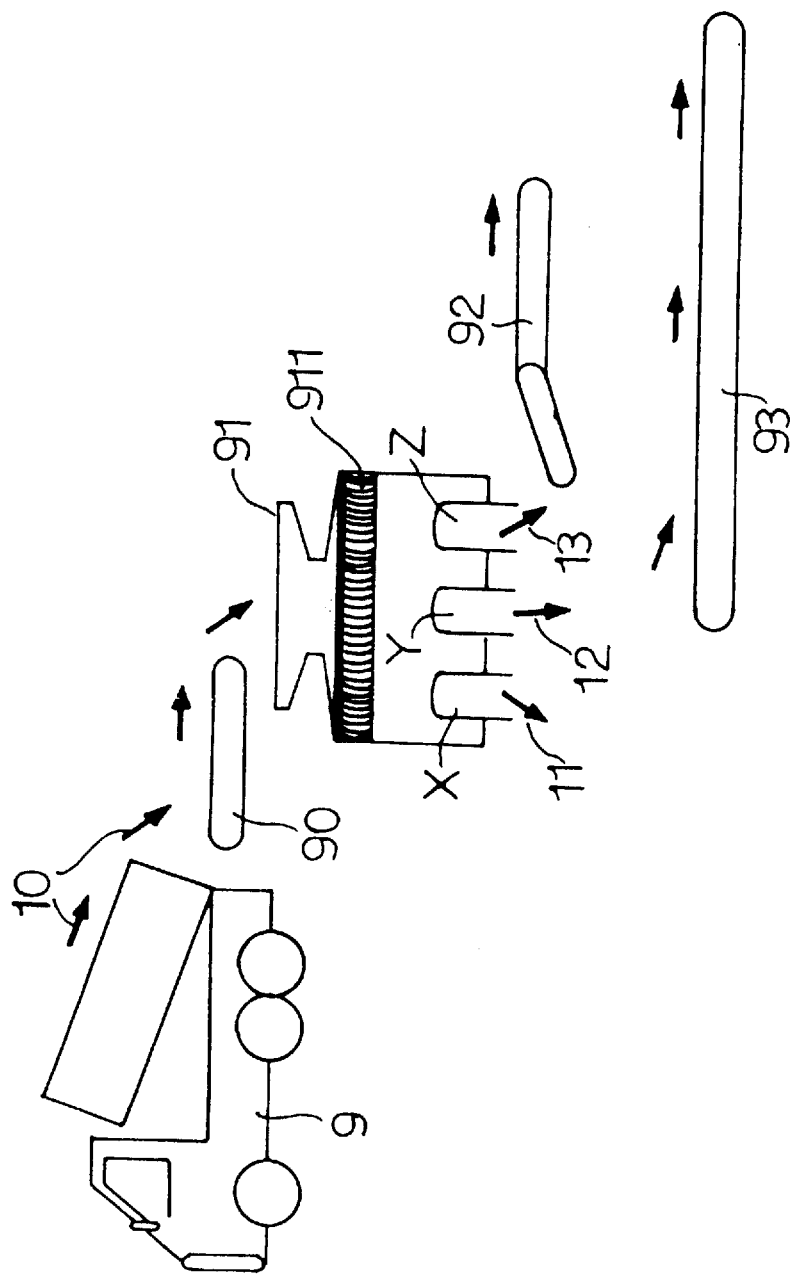
FIG. 3 is the flow sheet of related apparatus for waste sorting according to the invention.

Based on the process described above and with reference to FIG. 2 and 3, the apparatus for energy recovery through waste classification and calcination according to the invention will be described in detail hereinafter. The apparatus of the invention comprises: garbage wagon (9) which carries wastes (10) and unloaded onto a conveying belt (90) to convey wastes (10) to a crusher (91) equipped with a pulverator (911) therein for pulverizing wastes (10). Said pulverator can generate huge wind power which can lower water content of wastes and sort pulverized wastes based on their specific gravities. Wastes after sorting based on specific gravities can be classified into: mixed wastes (11), comprising metals, cans, synthetic resins, stone, wood, bamboo, concrete, and so on, which are in a form of lump, and among which, larger wood block can be picked up for burning; organic wastes (12), comprising ordinary family kitchen garbages of vegetable and animal origins, and tree branches and leaves, which are pulverized into fine grains; and light weight wastes (13), comprising papers, clothes, plastic bags and the like, which are pulverized into pieces. These three types of wastes are discharged separately from outlets (X, Y, Z) of the pulverator (91). Among which, mixed wastes (11) discharged out of outlet (X) can be disposed by landfill process, organic wastes (12) discharged out of outlet (Y) can be conveyed via conveying belt (23) to the conveying lines (23) of burning plate (23) in the calcinating furnace (20), while light weight wastes (13) out of outlet (Z) can be conveyed via conveying belt (93) to the inlet (214) on lid (213) of cracking furnace (21) in the calcination furnace (20).

Figure 4:
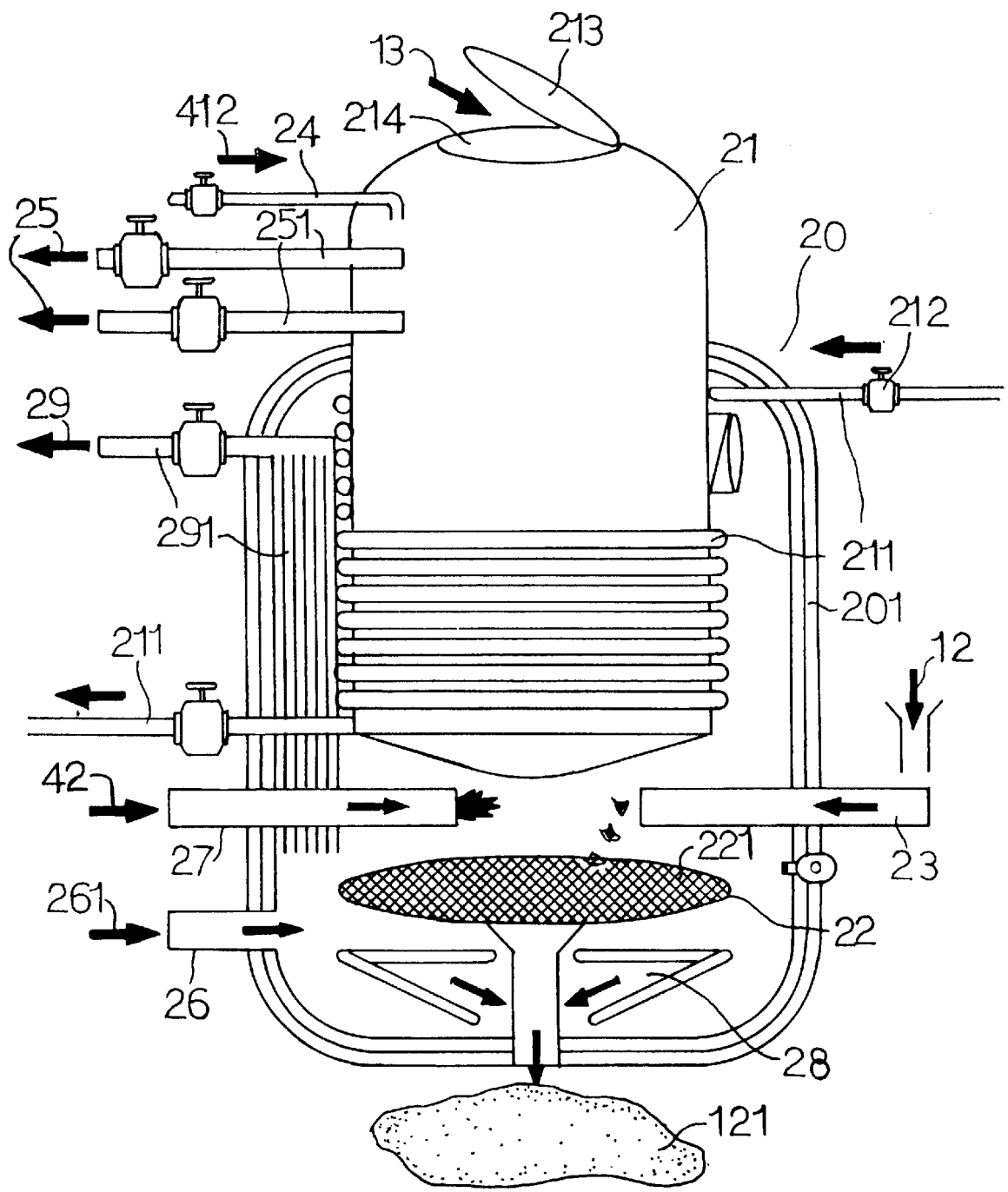
FIG. 4 is a diagram showing the structure of calcination furnace for fusing plastic wastes according to the invention.

Now refer to FIG. 4, a diagram showing the structure of the calcination furnace (20) in the apparatus for energy recovery through wastes classification and calcination according to the invention, the furnace body (201) of said calcination furnace (20) is provided with a cracking furnace (21) at an appropriate place above, and around said furnace body (201), a cooling water lines (211) with valve (212) at suitable place thereon is provided, which can be used to regulate the flow rate of cooling water so as to control the temperature change in the cracking furnace (21). A lid (213) is provided on top of the calcination furnace, which can be opened for introducing light weight wastes (13) into the cracking furnace (21). The cracking furnace is connected with a heavy oil line (24) having a valve (241) which can control the amount of heavy oil flowing into the cracking furnace (21) (the heavy oil can be replaced by heavy petrols or light oil) for promoting cracking of plastic wastes inside the cracking furnace (21). The cracking furnace is further connected with a oil gas line (251) which can recover oil gas (25) generated through cracking of plastics contained in melted light weight wastes (13) in the cracking furnace. Heavy oil line (24) can be used further as a safety system in case when light weight wastes (13) contain large amount of foams or sponges which receive heat more quickly, or when oil gas line (251) is blocked such that oil gas generated can not exit which may lead to increase of pressure inside the cracking furnace (21), then oils contained in the cracking furnace (21) can be discharged via the heavy oil line (24) into a heavy oil tank, and meanwhile, cool oil gas by means of the heavy oil so as to prevent risk of excess high pressure.

At a lower part of the cracking furnace (21), a burning plate (22) is provided, around which plate (22) are equipped with air line (26), gas line (27) and wastes conveying line (23). The waste conveying line (23) can spread organic waste (12) on the burning plate (22), and after mixed with air (261) from air line (26) and gas (42) from gas line (27), the organic waste (12) can be burned on the burning plate (22), while heat generated during burning of organic wastes can be transferred indirectly to the cracking furnace above the burring plate (22) so as to melt and evaporate plastics into oil gas (25) which is discharged via oil gas line (251). In addition, since the burning plate (22) itself is provided a plurality of holes (221) thereon and can rotate such that wastes (12) can be distributed uniformly thereon as well as ash (121) produced after burning of wastes can fall down through those holes (221) onto a mobile plate (28) when there is sufficient ashes (121) on the mobile plate, the weight of said ashes will force the mobile plate (28) titling such that those ashes will flow automatically out of the furnace body (201) along the mobile plate. Further, at suitable high inside the calcination furnace (20), there is provided a flue gas line (291) which can collect flue gas (29) having a high temperature of 600° C. generated through burning of organic wastes (12) on the burning plate (22) and introduce said flue gas (29) into a secondary calcination furnace (202) where the temperature of said flue gas (29) can be raised to 1000° C. and by passing through a heat exchanger (203), it can form a high pressure and high temperature air for using in a steam electricity co-generating system (204) included in the apparatus according to the invention.

After introducing light weight wastes (13) into the cracking furnace (21) of the calcination furnace according to the invention, a oil material (412) of a weight ratio of 1:10 (preferably a heavy oil, since its boiling point is above 400° C. such that it can dissolve and vaporize plastics before boiling) is charged, then, the furnace is closed and heated to 85°–130° C. for first step heating to dissolve completely plastics wastes. Thereafter, the temperature is increased gradually, gas evolution begins at about 200° C., and pressure increases dramatically. It should be noted that pressure control must be taken carefully throughout the whole heating course by constantly discharging the internal oil gas (25) so as to keep pressure at 4 Kg/cm2. Subsequently, heating is continued slowly to reach a temperature of 340°–380° C. where plastics wastes in the furnace becomes sticky. When the temperature reaches 400°–450° C., gas production rate is the fastest and while at 500° C., all gasifiable materials have been gasified and passed through oil gas line to subsequent process. The residues (131) remained in the furnace comprises original filler and residual carbon which, after cooled under reduced pressure, is in a form of black, light, porous sponge-like material which can be used as adsorption agent or, depending on the nature of plastis waste, can be used to obtain products with commercial value such as coke, tar, active coke and so on. Moreover, due to its heat resistance and low thermal conductivity, they may be used to produce excellent materials such as carbon brick (a kind of advanced refractory brick), heat insulating materials and the like. In addition, after being ground by means of grinding machine to a powder of a particle size of 2mm, they can be used in heat insulating coatings for car and when the powder is mixed with sticky asbestos or other refractory material and water under stirring in a blender and then extruding and calcinating, refractory bricks can be obtained.

Figure 5:
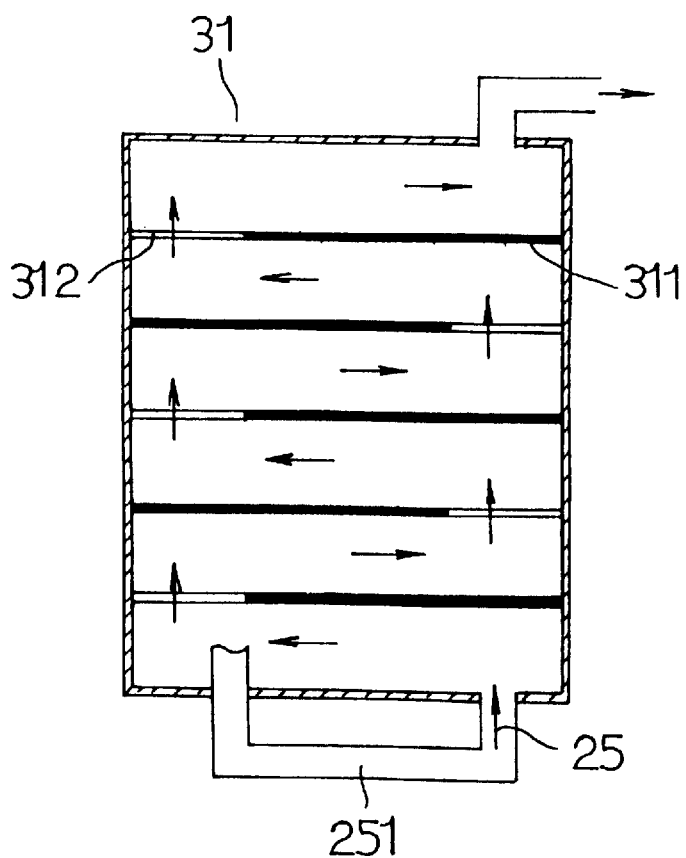
FIG. 5 is a schematic diagram showing the reaction furnace for irreversible cracking reaction of oil gas according to the invention.

As shown in FIG. 5, reactor (31) is a rectangular heating apparatus having a number of internal horizontal spacers arranged along vertical axis (311), each of which has a screen plate (312) on one end thereof, wherein screen plates on adjacent spacers are each on an alternatively opposite end for communicating and those screen plates can be heated to 500°–600° C. with pressure controlled at 2 Kg/cm2. When gas (25) produced in the cracking furnace (21) of the calcination furnace is in a reversible state due to uncompletely cracking, the degraded chains may be rearranged into a form of liquid or gel which might block lines. In view of this, according to the invention, those oil gas (25) is introduced first into the reactor (31) for preheating, and then, by means of the retarding effect of the screen plates (312), macromolecules are released and cleaved gradually into small molecules, while the cracking process in the cracking furnace is continued so as to block the reverse reaction and at the same time, by controlling temperature at about 400° C., cracking of molecules can be stopped while instant rearrangement or stabilization occurs so that reverse reaction will not happen.

Furthermore, irreversibly cracked oil gas (25) is collected by a first condenser (32) and its temperature is lowered stepwise to about 100° C. so as to stabilize completely the chemical state of the gas flow. Under this circumstance, macromolecules are converted into small ones and part of which have been condensed into liquid. Subsequently, the temperature of oil gas (25) is lowered further down to ambient temperature of about 35° C. by means of a second condenser (33), where the oil gas (25) is subject to precipitate in a precipitating tank (34) to remove contaminants in the liquid. Those contaminants are discharged out of a waste water treator (35), while cleaned filtrate is transferred into a oil/gas separating tank (40) to settle down liquid alkanes higher than C5 (crude oil) (41). On the other hand, noncondensed gaseous alkanes lower than C4 (42) is pressure liquified and stored in a gas storage tank (44), which, after removing hazardous contaminants in a aqueous washing tank, is subject to be packed in cylinders (44) for selling or to supply as fuel to in-line calcinating furnace (20), secondary calcination furnace (202), reactor (31) and fractionating column (60).

The crude oil (41) in the oil/gas separating tank (40) is delivered continuously into a fractionating column (60) where, under heating to about 450° C. by burning gas, distillate (411) is condensed to 450° C. by a cooler (61) and then subject to stepwise distillation by means of a distiller (62) and the distillates are collected and stored. The distillate (413) obtained at 200°–450° C. having a quality close to diesel is stored in oil storing tank (63), while the distillate (414) obtained at 20°–200° C. having a quality close to gasoline is stored in a second oil storage tank (64) and is transported to washing tanks (65, 66) for pickling, neutralizing and removing contaminants therein, and then, after removing trace water with activated clay and decoloring, can be recovered as diesel (671) and gasoline to be stored in diesel storage tank (67) and gasoline storage tank (68) respectively. Moreover, tetraethyllead can be incorporated into the gasoline obtained to formulate into advanced gasoline (681) which, after being incorporated with methyl butyl ether, can be formulated into leadless gasoline (682) for marketing at gas station.

In addition, heavy oil (412) settled in fractionating column (60) can be recovered in heavy oil storage tank (45) and subsequently used in the cracking furnace (21) of the calcination furnace (20).

Accordingly, the apparatus for energy recovering through waste classification and calcination not only can sorting and treating wastes, but also can recover sufficiently energy sources in wastes (gas, diesel, advanced gasoline and the like), wherein part of the energy source can be used for maintaining operation of the invention so that the invention can be practiced independently without addition of external energy sources.

Many changes and modifications in the above described embodiment of the invention can, of course, be carried out without departing from the scope thereof Accordingly, to promote the progress in science and the useful art, the invention is disclosed and is intended to be limited only by the scope of the appended claims.

What is claimed is:

1. An apparatus for energy recovering through waste classification and calcination, comprises
    a crusher, crushing wastes into broken species, and sorting said broken wastes based on their specific gravities into: mixed wastes, organic waste and light weight wastes, wherein said mixed wastes can be disposed by landfill;
    a calcination furnace, calcining said organic wastes and light weight wastes, comprising
        a cracking furnace, provided at an appropriate place inside said calcination furnace, and being equipped with a lid at top thereof for introducing said light weight wastes, a heavy oil line for introducing heavy oil to mix and crack said plastics wastes, a oil gas line for recovering oil gas generated from cracking of said melted plastics in said light weight wastes;
        a burning plate, provided at a proper place below said cracking furnace, and being equipped with a air line, a gas line and a waste conveying line, where organic wastes being spreaded on said burning plate via said waste conveying line and mixed with air and gas charged from said air line and said gas line respectively, thereby said organic wastes on said burning plate being subject to calcinating treatment such that high temperature heat generated therefrom being able to transfer indirectly to said cracking furnace above for melting and vaporizing said plastics into oil gas which is discharged via said oil gas line;
    a reactor, receiving and heating said oil gas under controlled pressure to cleave molecules as an irreversible reaction,
    a cooler, stepwise cooling said products obtained in said reactor to near ambient temperature to condense said products;
    a settling tank, settling down said condensed products obtained from said reactor;
    an oil/gas separating tank, separating said products into a crude oil and a fuel gas;
    a fractionating column, heating said crude oil;
    a cooler, cooling said crude oil;
    a distiller, stepwise distilling said crude oil and collecting and storing respective distillates;
    washing tanks, pickling, neutralizing and removing contaminants in said distillates to obtain pure diesel and gasoline; whereas fuel gas can be pressure liquified to be stored or packed in cylinders for marketing or used as heat sources for said apparatus.

2. An apparatus as in claim 1, comprises further a secondary calcination furnace which heats said high temperature flue gas generated in said calcination furnace to a higher temperature, and a heat exchanger which converts said higher temperature flue gas into high pressure high temperature air for using in a in-line steam electricity co-generating system.

3. An apparatus as in claim 1, wherein said burning plate can rotate and comprises a plurality of holes, thereby distributes uniformly said wastes thereon, while residues generated after burning said wastes can fall down through said holes onto a mobile plate below said burning plate and force said mobile plate to tilt under weight of said residues so as to discharge said residue out of said calcination furnace.

4. An apparatus as in claim 1, wherein said reactor is a rectangular heating apparatus having a number of internal horizontal spacers arranged along vertical axis, each of said spacer has a screen plate on its one end and said screen plates on adjacent spacers are each on an alternatively opposite end for communicating, thereby is characterized by cleaving molecules layer by layer.

* * * * *